US008864179B2

(12) United States Patent
Kitagawa

(10) Patent No.: US 8,864,179 B2
(45) Date of Patent: Oct. 21, 2014

(54) PIPE COUPLING APPARATUS

(75) Inventor: Hiroyuki Kitagawa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 667 days.

(21) Appl. No.: 12/673,284

(22) PCT Filed: Aug. 11, 2008

(86) PCT No.: PCT/JP2008/064410
§ 371 (c)(1),
(2), (4) Date: Feb. 12, 2010

(87) PCT Pub. No.: WO2009/022679
PCT Pub. Date: Feb. 19, 2009

(65) Prior Publication Data
US 2011/0198841 A1 Aug. 18, 2011

(51) Int. Cl.
*F16L 37/18* (2006.01)
*F16L 37/56* (2006.01)
*F16L 37/36* (2006.01)
*F16L 37/32* (2006.01)

(52) U.S. Cl.
CPC .......... *F16L 37/56* (2013.01); *F16L 2201/10* (2013.01); *F16L 37/36* (2013.01); *F16L 37/32* (2013.01)
USPC .................................. 285/124.3

(58) Field of Classification Search
CPC ....... F16L 35/00; F16L 37/252; F16L 37/008; F16L 37/1205; F16L 37/32; F16L 37/56; F16L 37/565; F16L 37/36; F16L 37/28; F16L 19/06; F16L 25/065; F16L 3/2235; F16L 41/03
USPC .................. 285/38, 309, 310, 84–86, 91, 93, 285/124.1–124.5, 316, 276, 277
See application file for complete search history.

(56) References Cited

U.S. PATENT DOCUMENTS 1,164,197 A * 12/1915 Kildear .......................... 70/161
2,089,259 A * 8/1937 Herd .............................. 285/26
(Continued)

FOREIGN PATENT DOCUMENTS

GB 2027145 A * 2/1980 ............. F16L 37/00
JP 7-293772 11/1995
(Continued)

OTHER PUBLICATIONS

International Search Report issued Sep. 2, 2008 in corresponding International Application No. PCT/JP2008/064410.

*Primary Examiner* — Daniel P Stodola
*Assistant Examiner* — James Linford
(74) *Attorney, Agent, or Firm* — Wenderoth, Lind & Ponack, L.L.P.

(57) ABSTRACT

A pipe coupling apparatus for simultaneously connecting and locking together pipe couplings comprising a plurality of sockets and plugs. The pipe coupling apparatus includes a socket-side unit having a plurality of sockets and a plug-side unit having a plurality of plugs. Each socket is provided with locking elements, and each plug is provided with an engagement groove. When the plug is inserted into the socket, the locking elements enter the engagement groove. A sleeve is provided displaceably between a locking completion position where it holds the locking elements from coming out of the engagement groove to lock the socket and the plug to each other and a retracted position separated from the locking completion position. A locking confirmation plate is displaceable from a locking unconfirmed position to a locking confirmed position when all the sleeves are at the locking completion position, thereby allowing confirmation of the completion of locking.

8 Claims, 18 Drawing Sheets

(56) References Cited

U.S. PATENT DOCUMENTS

| | | | | |
|---|---|---|---|---|
| 2,159,242 A | * | 5/1939 | Yanagi | 285/111 |
| 2,690,918 A | * | 10/1954 | Holte | 285/277 |
| 2,727,759 A | * | 12/1955 | Elliott | 251/149.6 |
| 3,214,195 A | * | 10/1965 | Zahuranec et al. | 285/27 |
| 3,393,395 A | * | 7/1968 | Hubbell | 439/333 |
| 3,414,295 A | * | 12/1968 | Rendessy | 280/511 |
| 3,433,504 A | * | 3/1969 | Hanes | 285/93 |
| 3,602,869 A | * | 8/1971 | Metz et al. | 439/191 |
| 4,026,581 A | * | 5/1977 | Pasbrig | 285/24 |
| 4,089,549 A | * | 5/1978 | Vyse et al. | 285/124.4 |
| 4,116,476 A | * | 9/1978 | Porter et al. | 285/124.4 |
| 4,203,321 A | * | 5/1980 | Vyse et al. | 73/168 |
| 4,615,546 A | * | 10/1986 | Nash et al. | 285/26 |
| 4,906,123 A | * | 3/1990 | Weskamp et al. | 403/322.2 |
| 4,915,419 A | * | 4/1990 | Smith, III | 285/26 |
| 5,316,347 A | * | 5/1994 | Arosio | 285/26 |
| 5,342,098 A | * | 8/1994 | Wilkins | 285/26 |
| 5,845,943 A | * | 12/1998 | Ramacier et al. | 285/12 |
| 2005/0012330 A1 | * | 1/2005 | Schmidt | 285/317 |
| 2005/0101939 A1 | * | 5/2005 | Mitchell | 604/533 |
| 2006/0091683 A1 | * | 5/2006 | Hawthorne | 294/82.28 |
| 2006/0254327 A1 | * | 11/2006 | Stachowiak | 70/164 |

FOREIGN PATENT DOCUMENTS

| | | |
|---|---|---|
| JP | 9-119579 | 5/1997 |
| JP | 2003-35389 | 2/2003 |
| JP | 2004-100911 | 4/2004 |
| JP | 2006-307992 | 11/2006 |

\* cited by examiner

PIPE COUPLING APPARATUS

BACKGROUND OF THE INVENTION

I. Technical Field

The present invention relates to a pipe coupling apparatus enabling a plurality of pipe couplings to be simultaneously coupled together and decoupled from each other.

II. Description of the Related Art

Japanese Patent Application Publication No. 2006-307992 discloses a pipe coupling apparatus including a socket-side unit having a plurality of sockets (female coupling members) and a plug-side unit having a plurality of plugs (male coupling members) corresponding to the sockets and enabling the mutually corresponding sockets and plugs to be connected together, respectively, by coupling the socket-side unit and the plug-side unit. In this pipe coupling apparatus, members for coupling provided substantially at the respective centers of the socket- and plug-side units are fitted and locked to each other to couple the two units, thereby allowing the mutually corresponding sockets and plugs to be connected together, respectively.

SUMMARY OF THE INVENTION

An object of the present invention is to provide a pipe coupling apparatus in which each socket and the corresponding plug that are to be coupled together in the above-described pipe coupling apparatus are also locked in coupled relation, and it can be checked whether or not the socket and the corresponding plug are locked in coupled relation.

The present invention provides a pipe coupling apparatus including a socket-side unit having a socket support member and a plurality of tubular sockets supported parallel to each other by the socket support member, a plug-side unit having a plug support member and a plurality of tubular plugs supported parallel to each other by the plug support member with a positional corresponding relationship with the sockets, and a plurality of locking devices that lock the plugs and the corresponding sockets to each other, respectively, when the plugs are inserted into the corresponding sockets to reach a connecting position where the plugs are to be connected with the sockets, respectively, as a result of moving the socket-side unit and the plug-side unit relatively toward each other with the plugs facing the corresponding sockets, respectively. The locking devices each comprise a locking completion member displaceable between a locking completion position for completing the locking of the plug and the corresponding socket and a retracted position separated from the locking completion position, and an urging device that urges the locking completion member toward the locking completion position so that the urging device moves the locking completion member toward the locking completion position when the plug reaches the connecting position where the plug is to be connected with the corresponding socket. The pipe coupling apparatus further includes a confirmation member mounted on one of the socket-side unit and the plug-side unit. The confirmation member is displaceable to a locking confirmed position when all the locking completion members are at the locking completion position. When any of the locking completion members is positioned at the retracted position, the confirmation member is prevented from being displaced to the locking confirmed position by the locking completion member positioned at the retracted position.

In this pipe coupling apparatus, a confirmation member is mounted on one of the socket-side unit and the plug-side unit. The confirmation member is displaceable to the locking confirmed position when all the locking completion members are at the locking completion position. When any of the locking completion members is at the retracted position, the confirmation member is positioned at a locking unconfirmed position where the confirmation member is prevented from being displaced to the locking confirmed position by the locking completion member positioned at the retracted position. Therefore, it can be checked from the position of the confirmation member whether or not the locking of all the plugs and the corresponding sockets has been completed. Accordingly, it is possible with the pipe coupling apparatus to let a fluid flow after it has been confirmed that the locking of all the plugs and the corresponding sockets has been completed, and hence possible to perform a safe operation.

Specifically, the arrangement may be as follows. The locking completion member is mounted on the outer peripheral surface of one of the plug and the corresponding socket displaceably between the locking completion position and the retracted position. The confirmation member is a plate-shaped member displaceable on a surface of the socket-side unit facing the plug-side unit in a direction perpendicular to the axes of the sockets and having openings through which the sockets extends, respectively. When any of the locking completion members is positioned at the retracted position, the confirmation member is prevented from being displaced to the locking confirmed position by engagement between the locking completion member positioned at the retracted position and the edge of the opening through which, the socket, which is associated with the locking completion member positioned at the retracted position, extends.

The arrangement may also be as follows. The locking completion member is mounted on the outer peripheral surface of one of the plug and the corresponding socket displaceably between the locking completion position and the retracted position. The confirmation member is a plate-shaped member displaceable on a surface of the plug-side unit facing the socket-side unit in a direction perpendicular to the axes of the plugs and having openings through which the plugs extends, respectively. When any of the locking completion members is positioned at the retracted position, the confirmation member is prevented from being displaced to the locking confirmed position by engagement between the locking completion member positioned at the retracted position and the edge of the opening through which the plug, which associated with the locking completion member positioned at the retracted position, extends.

More specifically, the arrangement may be as follows. The locking completion member is a sleeve mounted around one of the plug and the corresponding socket displaceably between the locking completion position and the retracted position in the axial direction of the sleeve. The sleeve has an outer surface that aligns with the edge of the opening in a direction perpendicular to the axial direction when the sleeve is at the retracted position, and a recess formed on the outer surface. The recess aligns with the edge of the opening in a direction perpendicular to the axial direction when the sleeve is at the locking completion position. When the confirmation member is not positioned at the locking confirmed position, the edge of the opening is engaged with the outer surface of the corresponding locking completion member. When the confirmation member is positioned at the locking confirmed position, the edge of the opening is engaged with the recess on the outer surface of the corresponding locking completion member.

The recess may be an annular groove.

Further, the arrangement may be as follows. Each of the locking devices has a locking member that engages with both the plug and the corresponding socket to prevent the plug and the socket from being axially displaced relative to each other when the plugs are inserted into the corresponding sockets to reach the connecting position where the plugs are to be connected with the sockets, respectively, as a result of moving the socket-side unit and the plug-side unit relatively toward each other with the plugs facing the corresponding sockets, respectively. The locking completion member positioned at the locking completion position holds the locking member at a position where the locking member engages with both the plug and the corresponding socket.

The pipe coupling apparatus may further comprise an indicator provided on one of the socket-side unit and the plug-side unit to indicate the displacement of the confirmation member to the locking confirmed position in response to the displacement of the confirmation member. The indicator has a displaceable member displaceable in response to the displacement of the confirmation member to the locking confirmed position. The indicator indicates the displacement of the confirmation member by the displacement of the displaceable member.

Further, the arrangement may be as follows. The socket-side unit and the plug-side unit have a coupler for coupling them to each other. The coupler has a male coupling member and a female coupling member that are fitted to each other and locked in a coupled relationship when the plugs are inserted into the corresponding sockets to reach the connecting position where the plugs are to be connected with the sockets, respectively, as a result of moving the socket-side unit and the plug-side unit relatively toward each other with the plugs facing the corresponding sockets, respectively. With this arrangement, the socket-side unit and the plug-side unit are coupled together when all the sockets and the corresponding plugs are at the connecting position.

Specifically, the arrangement may be as follows. The coupler has a male coupling member provided on one of the plug support member and the socket support member and a female coupling member provided on the other of the plug support member and the socket support member. The male coupling member projects from a surface of the one support member facing the other support member and configured to be fitted and locked to the female coupling member. The female coupling member is displaceably supported by the other support member. The pipe coupling apparatus further comprises a pulling member that pulls the one support member toward the other support member by displacing the female coupling member fitted and coupled with the male coupling member in a direction away from the one support member, thereby allowing the plugs to be further inserted into the corresponding sockets to reach the connecting position where the plugs are to be connected with the sockets, respectively.

More specifically, the arrangement may be as follows. The male coupling member has a plunger part extending through a substantially central position of the one support member and displaceable relative to the one support member. The plunger part projects from the surface of the one support member facing the other support member so as to be fitted and locked to the female coupling member. The male coupling member further has a rear projecting part projecting from a surface of the one support member opposite to the surface from which the plunger part projects. The rear projecting part is provided with a spring member for urging the one support member toward the other support member to allow the male coupling member fitted and locked to the female coupling member to displace the one support member toward the other support member through the spring member when the pulling member displaces the female coupling member in the direction away from the one support member.

The pipe coupling apparatus may further comprise an urging device that urges the confirmation member toward the locking confirmed position from the locking unconfirmed position, and a holding member displaceable between a holding position where the holding member holds the confirmation member at the locking unconfirmed position against the urging device and an allowing position where the holding member allows the confirmation member to be displaced from the locking unconfirmed position to the locking confirmed position when the socket-side unit and the plug-side unit come close each other until the plugs and the sockets reach the connecting position. With this arrangement, the holding member is automatically displaced to the allowing position by the urging device when the socket-side unit and the plug-side unit come close each other until the plugs and the sockets reach the connecting position. The displacement of the holding member to the allowing position causes the confirmation member to be moved toward the locking confirmed position. In this regard, however, when the connection of any of the plugs and the corresponding socket has not yet been completed, the associated locking completion member is positioned at the retracted position; therefore, the confirmation member is prevented from being displaced to the locking confirmed position. Thus, it can be confirmed that the connection between the plugs and the sockets has not yet been completed.

In this case, the arrangement may be as follows. The confirmation member has a through-hole extending therethrough in a direction from the socket-side unit toward the plug-side unit. The holding member is a pin mounted on the one of the socket-side unit and the plug-side unit and urged toward the other of the socket-side unit and the plug-side unit. The pin has a forward end portion extending through the through-hole of the confirmation member and projecting toward the other of the socket-side unit and the plug-side unit. The forward end portion of the pin has a small-diameter portion extending rearward from its forward end and a large-diameter portion contiguous with the small-diameter portion. The pin holds the confirmation member at the locking unconfirmed position by engagement of the large-diameter portion with the wall surface of the through-hole. The pin is pushed in by the other of the socket-side unit and the plug-side unit, causing the large-diameter portion to be pushed out of the through-hole, when the socket-side unit and the plug-side unit come close to each other until the plugs and the sockets reach the connecting position, thereby allowing the confirmation member to be displaced to the locking confirmed position.

DETAILED DESCRIPTION OF THE INVENTION

Figure 1:
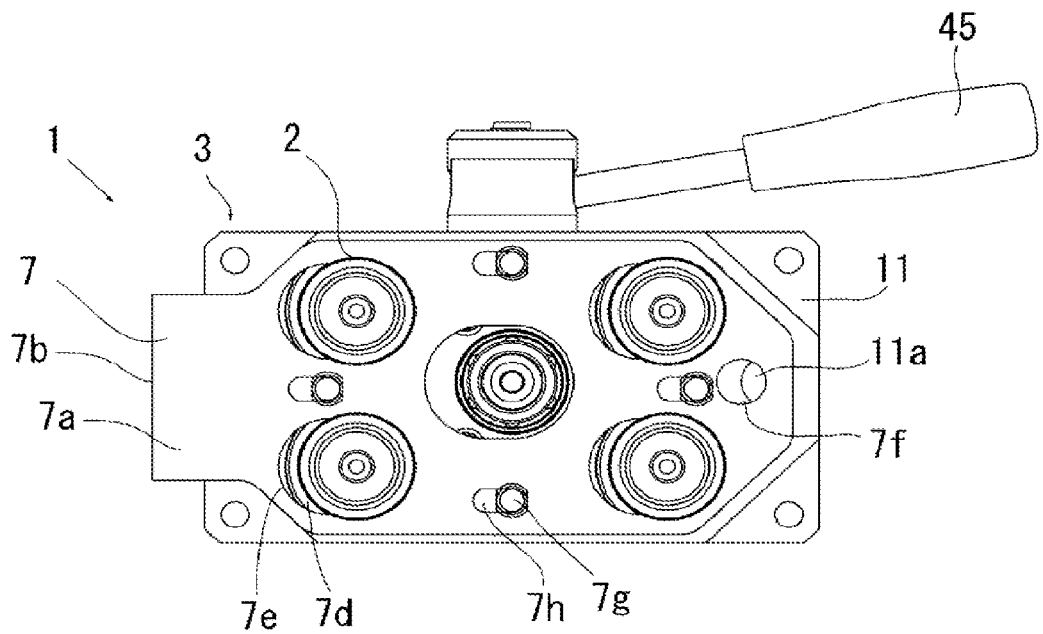
FIG. 1 is a front view of a plug-side unit of a pipe coupling apparatus according to an embodiment of the present invention, showing a state where a confirmation plate has been pushed.
Figure 2:
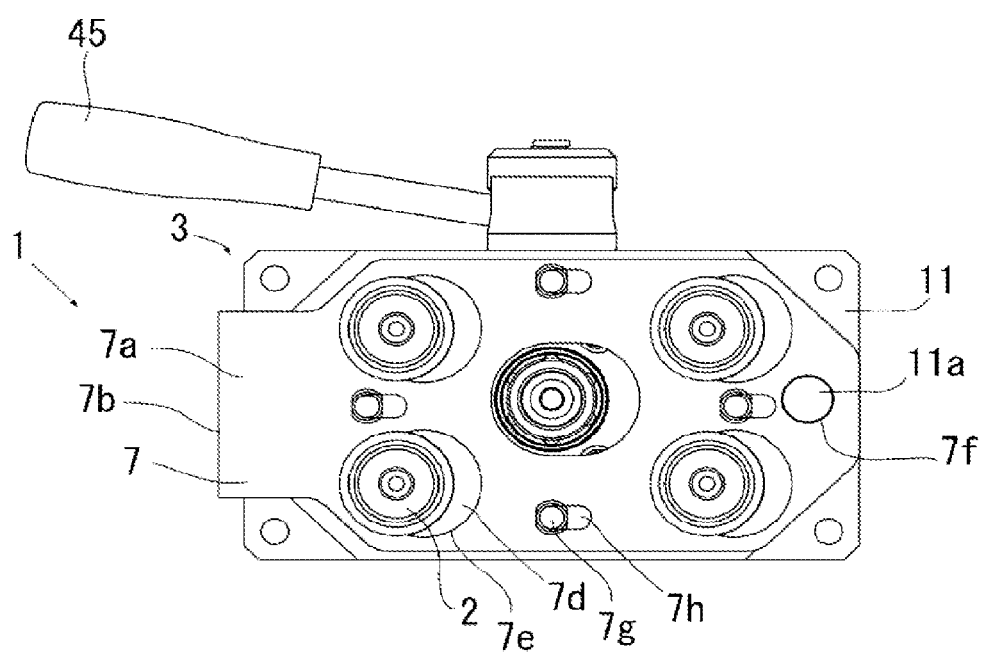
FIG. 2 is a front view of the plug-side unit in FIG. 1, showing a state where the confirmation plate is not pushed.

An embodiment of the pipe coupling apparatus according to the present invention will be explained below with reference to the accompanying drawings. The pipe coupling apparatus 1 according to the present invention includes a plug-side unit 3 having a plurality of plugs 2 and a socket-side unit 5 having a plurality of sockets 4 corresponding to the plug-side unit 3.

The plug-side unit 3 has a substantially rectangular plate-shaped plug support member (hereinafter referred to as simply "support member") 11 and a female coupling member 41 of a coupler 13 (described later) provided substantially in the center of the support member 11. The plug-side unit 3 further has tubular plugs 2 inserted and secured in a plurality of circular holes, respectively, formed in the support member 11. In addition, the support member 11 has a confirmation plate 7 slidably provided on its surface facing the socket-side unit 5.

The socket-side unit 5 has a substantially rectangular plate-shaped support member 21 and a male coupling member 23 of the coupler 13 provided substantially in the center of the support member 21. The socket-side unit 5 further has tubular sockets 4 inserted and secured in a plurality of circular holes, respectively, formed in the support member 21.

Figure 6:
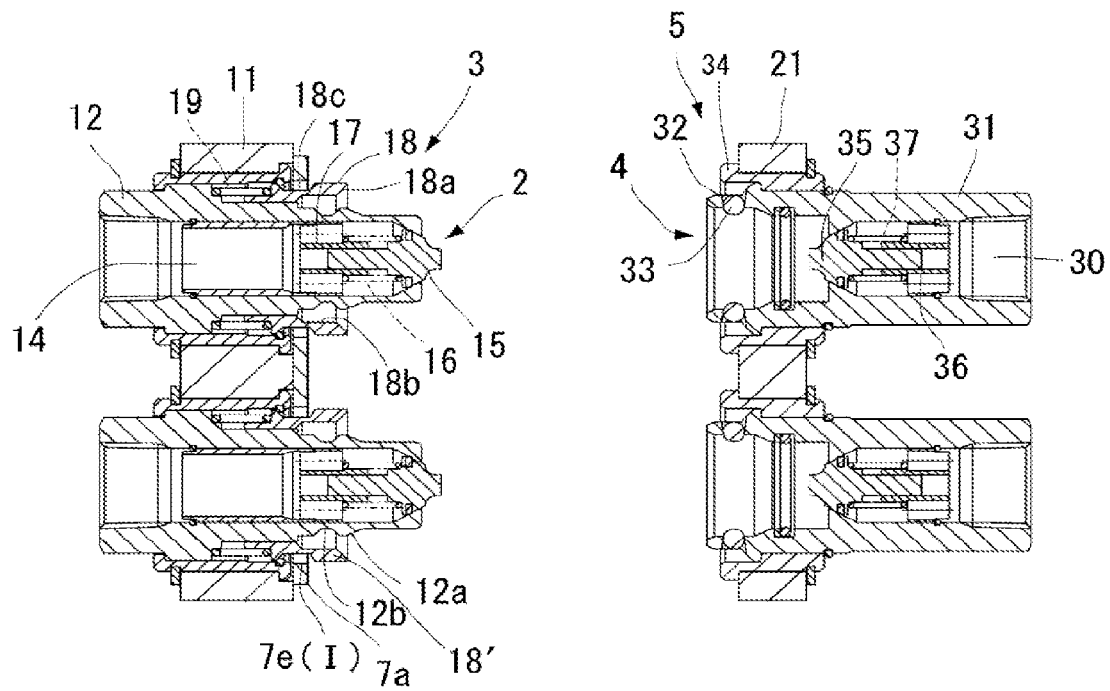
FIG. 6 is a longitudinal sectional view showing the sockets and the plugs in a state where the socket-side unit and the plug-side unit are not connected together.

As shown in FIG. 6, each plug 2 has a substantially cylindrical plug body 12 inserted and secured in the associated hole in the support member 11, a first valve member 15 that opens and closes a fluid passage 14 in the plug body, an urging member 16 that urges the first valve member 15 toward a fluid passage closing position (shown in FIG. 6), and a valve retaining member 17 that retains the first valve member 15.

The outer periphery of each plug body 12 has a locking device including a sleeve 18 and a sleeve urging member 19 that urges the sleeve 18 toward the socket-side unit 5. The sleeve 18 is movable between a locking completion position where it projects to a maximum extent toward the socket-side unit 5 and a retracted position where the sleeve 18 is displaced from the locking completion position in the opposite direction to the direction toward the socket-side unit 5.

Each socket 4 has a substantially cylindrical socket body 31 inserted and secured in the associated hole in the support member 21, a second valve member 35 that opens and closes a fluid passage 30 in the socket body 31, an urging member 37 that urges the second valve member 35 toward a fluid passage closing position (shown in FIG. 6), and a valve retaining member 36 that retains the second valve member 35.

The socket body 31 has, at its forward end, locking element holes 32 properly spaced from each other in the circumferential direction, locking elements 33 radially displaceably provided in the locking element holes 32, respectively, and a sleeve support member 34 that supports the sleeve 18 from the radially outer side when the socket 4 and the corresponding plug 3 are connected together.

The plug body 12 has on its outer peripheral surface a push portion 12a that pushes the locking elements 33 radially outward of the plug body 12 when the plug body 12 is inserted into the socket body 31 (described later). The plug body 12 further has an engagement groove 12b that receives the locking elements 33.

The sleeve 18 has a tapered surface 18a formed on its forward end portion. The locking elements 33 pushed radially outward of the plug body 12 by the push portion 12a abut against the tapered surface 18a as the socket body 31 is inserted, thus causing the sleeve 18 to move toward the retracted position. The sleeve 18 has on its inner peripheral surface a locking surface 18b that prevents the locking elements 33 engaged in the engagement groove 12b from moving radially outward. Further, the sleeve 18 has an annular groove 18c on its outer peripheral surface 18'.

The following is an explanation of the coupler 13 for coupling together the plug side unit 3 and the socket-side unit 5.

Figure 5:
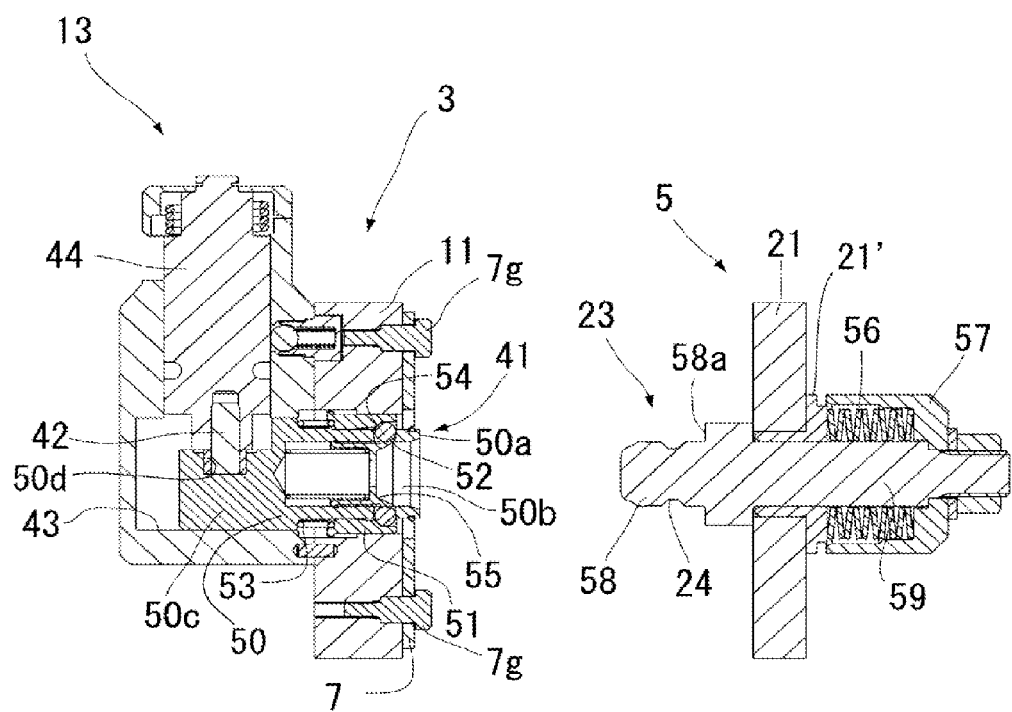
FIG. 5 is a longitudinal sectional view showing a female coupling member and a male coupling member constituting a coupler of the pipe coupling apparatus in a state where the socket-side unit and the plug-side unit are not connected together.

As has been stated above, the coupler 13 has a male coupling member 23 provided in the socket-side unit 5 and a female coupling member 41 provided in the plug-side unit 3 (see FIG. 5).

The male coupling member 23 has a plunger part 58 extending through the support member 21 and projecting forward from the front surface (left surface in FIG. 5) of the support member 21, and a rear projecting part 59 extending rearward from the support member 21. The rear projecting part has a cup-shaped housing 57 secured thereto. The housing 57 is provided therein with a coned disk spring 56. A tubular member 21' is provided between the coned disk spring 56 and the support member 21. The coned disk spring 56 presses the support member 21 against the plunger part 58 through the tubular member 21'. The support member 21 is displaceable relative to the male coupling member 23 rightward as seen in FIG. 5 while compressing the coned disk spring 56 through the tubular member 21'. The purpose of this arrangement is as follows. After the plug-side unit 3 and the socket-side unit 5 have been coupled together and the sockets 4 and the plugs 2 have been connected to each other, a pressurized fluid is passed through the sockets 4 and the plugs 2. When a fluid pressure acts to disconnect the sockets 4 from the plugs 2, the support member 21, to which the sockets 4 are secured, is allowed to be displaced relative to the plunger part 58 rightward as seen in FIG. 5, thereby enabling the fluid pressure to be received by not only the coupler 13 but also the sockets 4 and the plugs 2.

The female coupling member 41 is axially displaceably provided in an opening extending through the center of the support member 11. The female coupling member 41 has a tubular part 50 having an insertion hole 50b that slidably receives the plunger part 58, an outer sleeve 51 provided on the outer periphery of the tubular part 50, an urging member 53 that urges the outer sleeve 51 rightward as seen in FIG. 5, radial through-holes 52 formed in the tubular part 50, locking members 54 radially displaceable in the through-holes 52, respectively, and an inner sleeve 55 provided at a position on the inner peripheral side of the tubular part 50 to retain the locking members 54 from the radially inner side before the plunger part 58 is inserted. The inner sleeve 55 moves by being pushed with the plunger part 58 as inserted into the insertion hole 50b, thereby allowing the locking members 54 to engage with an engagement groove 24 on the plunger part 58.

The tubular part 50 has a connecting portion 50c provided at its left end. The connecting portion 50c is connected with a rotating shaft 44 through a connecting pin 42. The rotating shaft 44 has an operating lever 45 attached thereto to rotate the rotating shaft 44. The center axis of the rotating shaft 44 extends perpendicularly to the axis of the tubular part 50. The connecting pin 42 is provided parallel to the center axis of the rotating shaft 44 at a position decentered from the center axis. The connecting portion 50c is provided with a groove 50d extending in a direction normal to the plane of FIG. 5. The connecting pin 42 is engaged with the groove 50d slidably along the latter. With the above-described arrangement, as the rotating shaft 44 is rotated about its center axis with the operating lever 45, the connecting pin 42 revolves around the center axis of the rotating shaft 44 while sliding in the groove 50d, thus causing the connecting portion 50c and hence the tubular part 50 to be displaced in its axial direction.

Next, the confirmation plate will be explained.

As shown in FIG. 1, the confirmation plate 7 is a thin plate that is rectangular in front view and has a plane (surface area) slightly smaller than that of the support member 11. The confirmation plate 7 has a plate body 7a, a push portion 7b that is pushed to press the plate body 7a rightward as seen in FIG. 1, and a spring (urging device) 7c (shown in FIG. 4) that urges the plate body 7a leftward. The plate body 7a has a plurality of openings 7d, which receive the plurality of plugs 2 mounted on the support member 11 and the female coupling member 41 respectively.

The plate body 7a has four slots 7h provided at the upper, lower, right and left ends of the plate body 7a, and fall-preventing pins 7g are secured to the support member 11 through the slots 7h, thereby preventing the confirmation plate 7 from falling off the support member 11.

Further, the plate body 7a has an insertion hole 7f formed in its one-side end portion (right end portion in FIG. 1). The insertion hole 7f allows a connection confirmation pin (described later) 26 to be inserted therethrough. The support member 11 is also provided with a fitting hole 11a.

Figure 4:
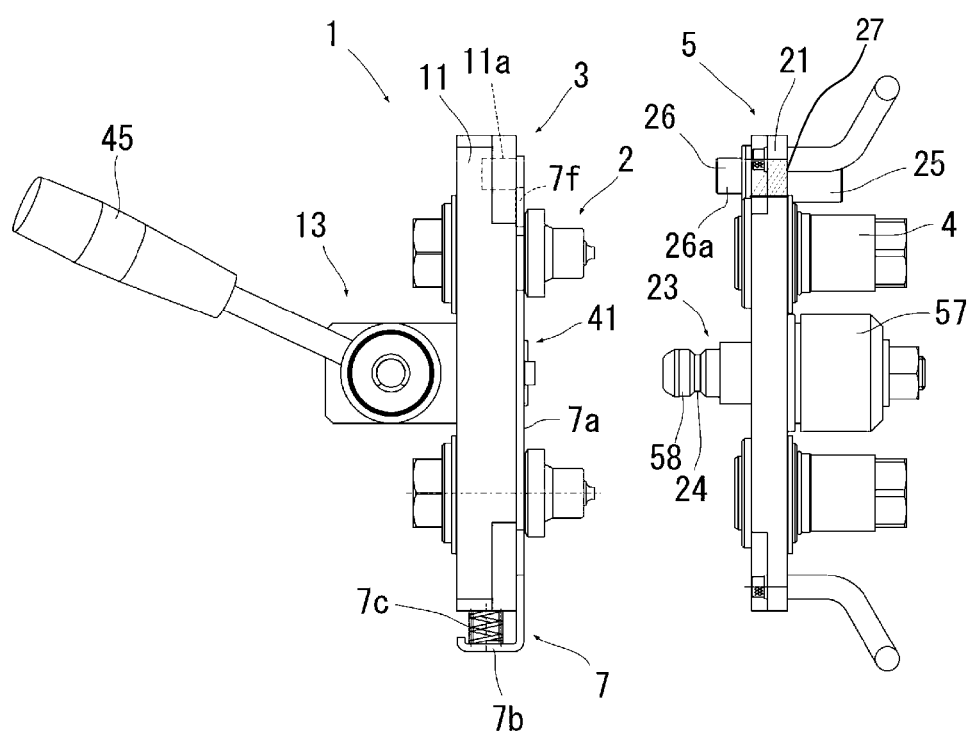
FIG. 4 is a plan view of the pipe coupling apparatus, showing a state where the socket-side unit and the plug-side unit are not connected together.

As shown in FIG. 4, the support member 21 of the socket-side unit 5 is provided with a tubular member 25 extending in a direction away from the plug-side unit 3. The tubular member 25 is provided with a connection confirmation pin 26 that is urged toward the plug-side unit 3 by a spring (i.e. urging device) 27.

Figure 10:
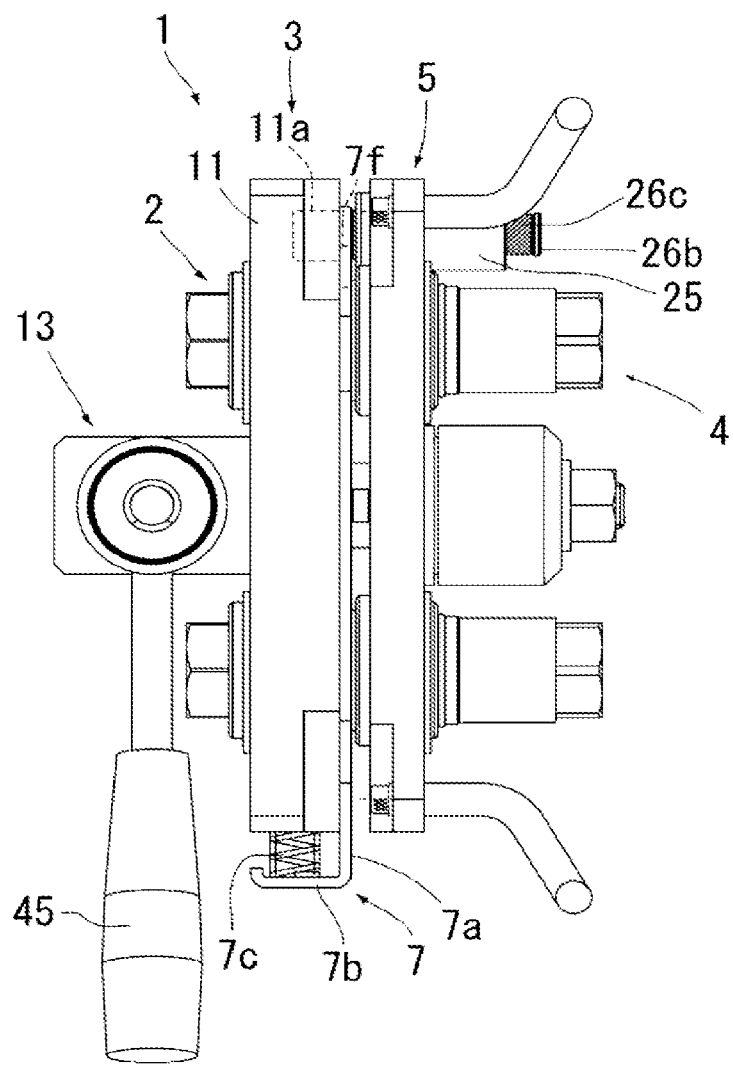
FIG. 10 is a plan view showing the socket-side unit and the plug-side unit that are in a locked state.
Figure 11:
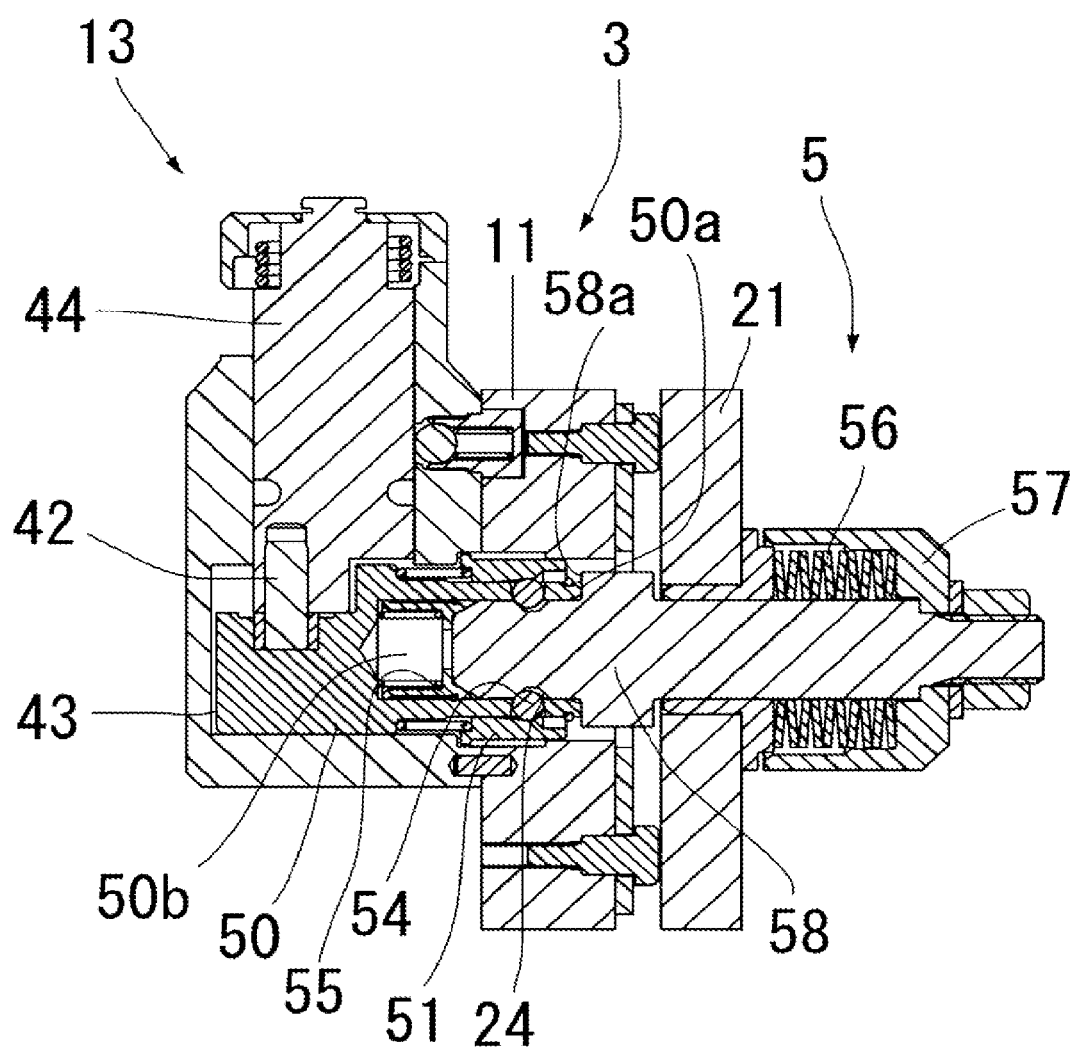
FIG. 11 is a longitudinal sectional view showing the female and male coupling members of the coupler when the socket-side unit and the plug-side unit are in the locked state.
Figure 12:
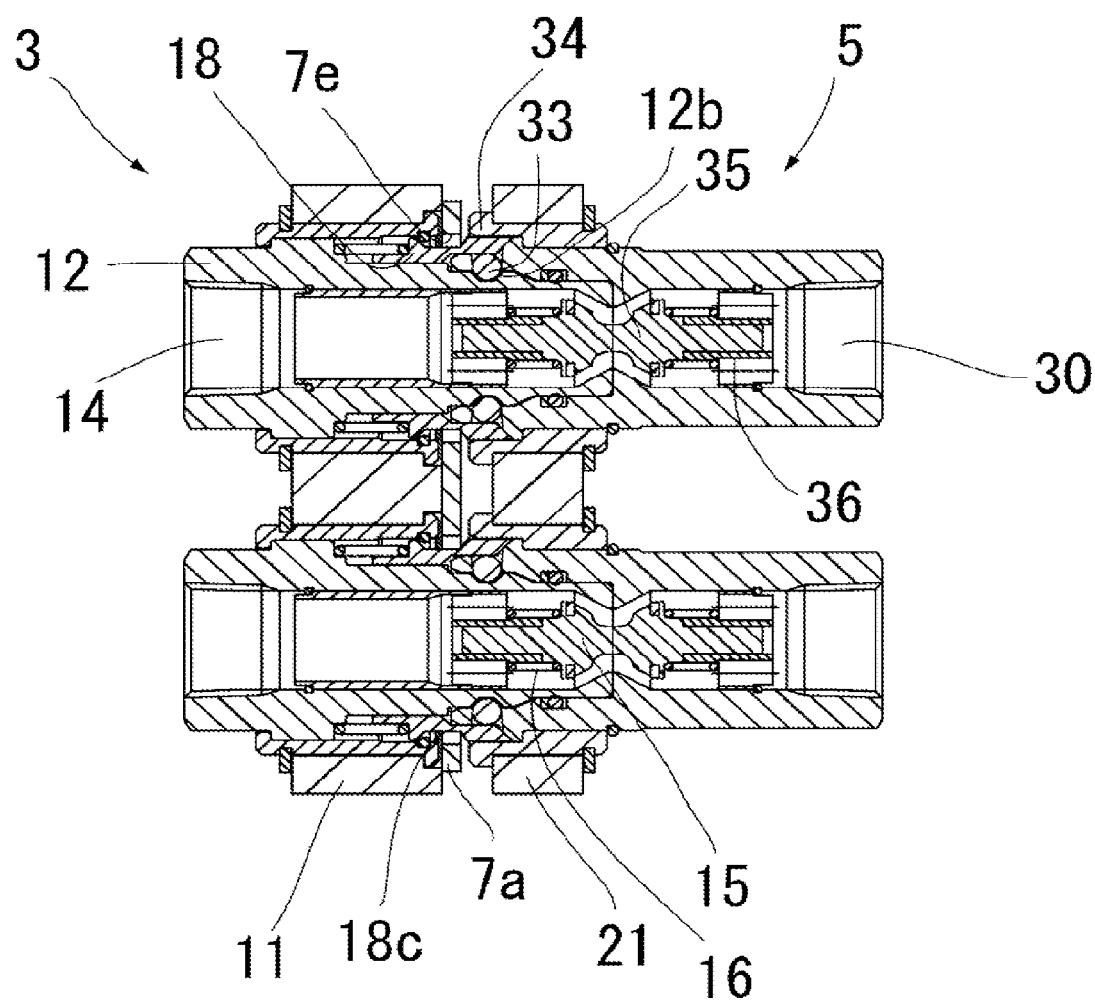
FIG. 12 is a longitudinal sectional view showing the sockets and the plugs when the socket-side unit and the plug-side unit are in the locked state.

As shown in FIG. 4, when the plug-side unit 3 and the socket-side unit 5 are not coupled together, one end (left end) 26a of the connection confirmation pin 26 is projecting toward the plug-side unit 3 from the support member 21, and the other end 26b of the connection confirmation pin 26 is concealed in the tubular member 25. When the plug-side unit 3 and the socket-side unit 5 are coupled together, the connection confirmation pin 26 is pushed (pressed) rightward in FIG. 4 by the plate body 7a of the confirmation plate 7 of the plug-side unit 3 against the force of spring (urging device) 27. As a result, the connection confirmation pin 26 projects from the outer (right) end of the tubular member 25 (see FIG. 10).

The peripheral surface of the end 26b of the connection confirmation pin 26 is colored in red to form an indicator 26c. When the connection confirmation pin 26 projects from the outer end of the tubular member 25, the red indicator 26c emerges from the tubular member 25.

The following is an explanation of the operation of the pipe coupling apparatus according to this embodiment.

<From Unconnected State to Temporary Locked State>

FIGS. 4 to 6 show the socket-side unit 5 and the plug-side unit 3 before they are connected together. In this state, the outer peripheral surface of the inner sleeve 55 holds the locking members 54 from entering the through-holes 52. The operator grips the socket-side unit 5 and presses it toward the plug-side unit 3 in a state where the female and male coupling members 41 and 23 of the coupler are axially aligned together and the sockets 4 and the plugs 2 are axially aligned with each other.

Figure 8:
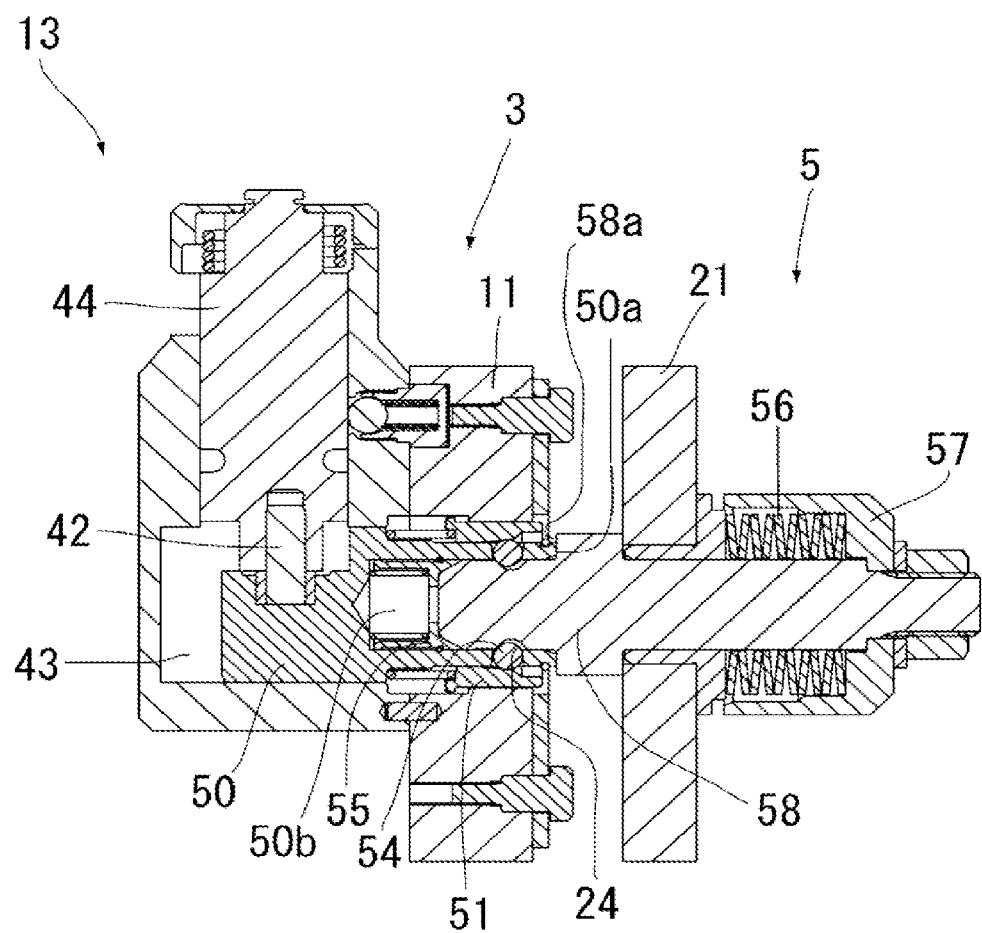
FIG. 8 is a longitudinal sectional view showing the female and male coupling members of the coupler when the socket-side unit and the plug-side unit are in the temporary locked state.
Figure 9:
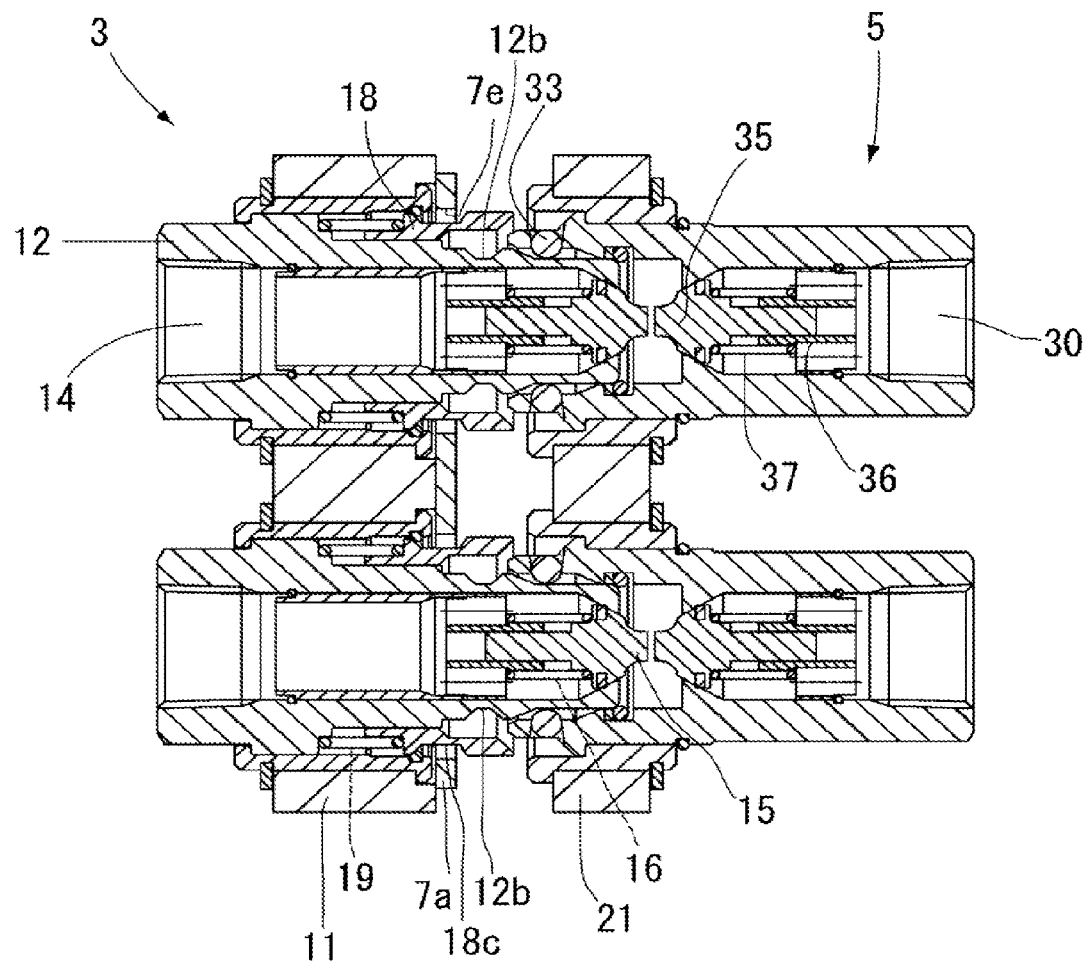
FIG. 9 is a longitudinal sectional view showing the sockets and the plugs when the socket-side unit and the plug-side unit are in the temporary locked state.

Consequently, in the coupler, the plunger part 58 is inserted into the insertion hole 50b of the tubular part 50. The plunger part 58 abuts against the inner sleeve 55 and moves toward the inner part of the insertion hole 50b (leftward in the figures). When the plunger part 58 is pushed in to a predetermined position, the locking members 54 fit into the engagement groove 24, and thus the coupler is brought into a temporary locked state (shown in FIG. 8). In the temporary locked state, the locking members 54 are held between the engagement groove 24 and the inner peripheral surface of the outer sleeve 51, and the female and male coupling members 41 and 23 of the coupler are placed in a coupled state. At this time, the forward end 50a of the tubular part 50 and a stepped portion 58a of the plunger part 58 abut against each other. In the temporary locked state, the sockets 4 and the plugs 2 have not yet been connected together (see FIG. 9).

<From Temporary Locked State to Locked State>

Figure 7:
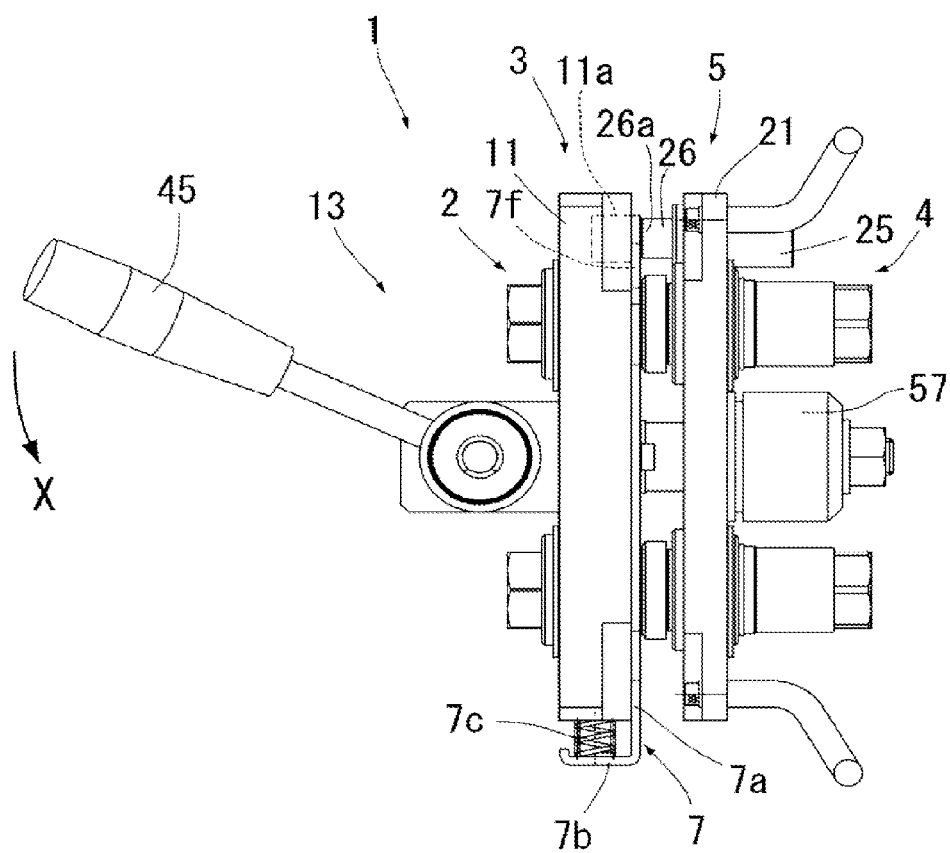
FIG. 7 is a plan view showing the socket-side unit and the plug-side unit that are in a temporary locked state.

When, in the temporary locked state, the operating lever 45 is turned counterclockwise (direction X) from the position shown in FIG. 7 to rotate the rotating shaft 44, the tubular part 50 is withdrawn leftward through the connecting pin 42 secured to the rotating shaft 44 at a decentered position relative to the latter, causing the socket-side unit 5 to be pulled toward the plug-side unit 3. When the operating lever 45 is turned to the position shown in FIG. 10, the tubular part 50 of the female coupling member 41 is withdrawn to a maximum extent, causing the socket-side unit 5 to be further pulled toward the plug-side unit 3.

At this time, the sockets 4 are also pulled toward the plugs 2, and the locking elements 33 of each socket 4 are pushed radially outward of the plug body 12 of the corresponding plug 2 by the push portion 12a of the plug 2. In addition, the tapered surface 18a is pushed by the locking elements 33, causing the sleeve 18 to be retracted. When the tubular part 50 is withdrawn into the opening to a maximum extent as stated above, the locking elements 33 fall into the engagement groove 12b, and the sleeve 18 is returned to the locking completion position by the urging force of the urging member 19. The locking elements 33 are held between the inner peripheral surface 18b of the sleeve 18 and the engagement groove 12b, thereby locking the plug 2 and the socket 4 to each other.

In this state, the first valve member 15 of the plug body 12 and the second valve member 35 of the socket body 31 are pushed against each other to thereby open the fluid passages 14 and 30.

In this way, coupling and locking of the socket-side unit 5 and the plug-side unit 3 are completed.

<Operation of Confirmation Plate>

The following is an explanation of the operation of the confirmation plate for confirming the locked state.

Figure 14:
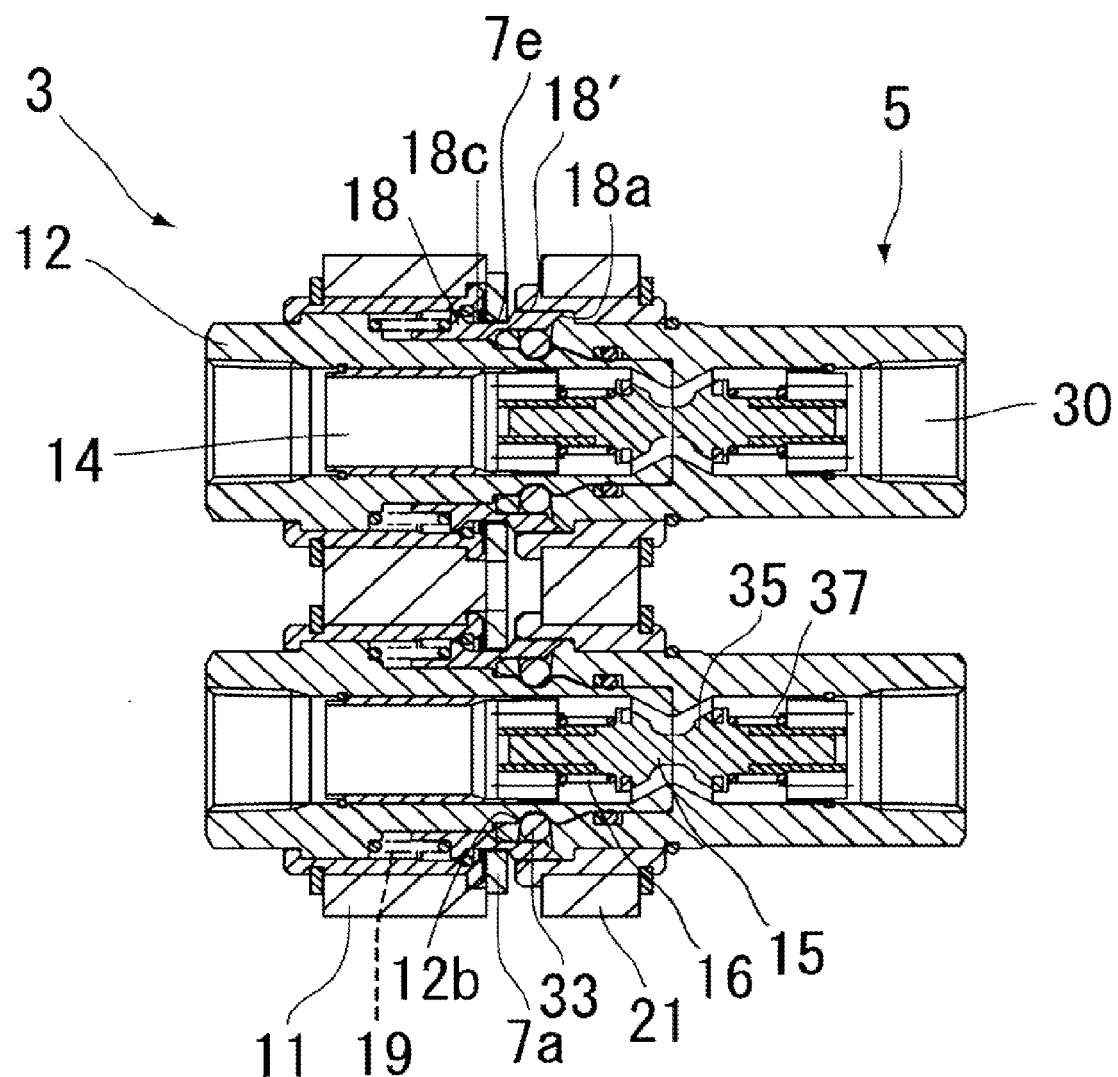
FIG. 14 is a longitudinal sectional view showing the sockets and the plugs when the confirmation plate has been moved to the locking confirmed position.
Figure 15:
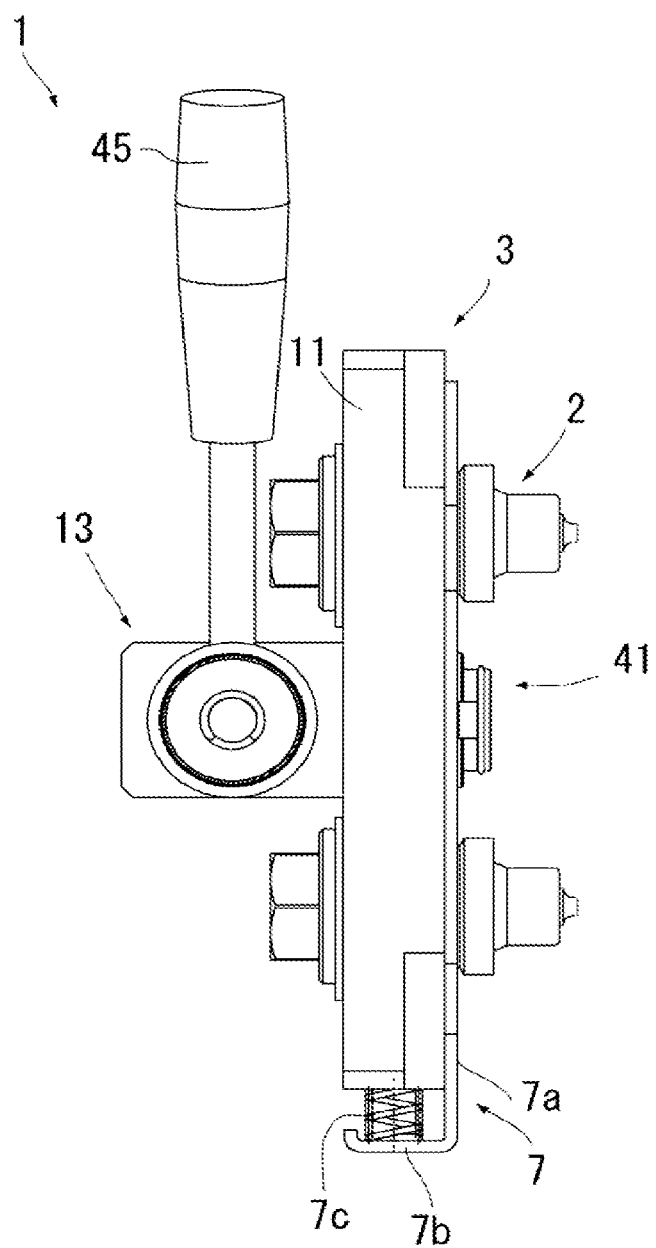
FIG. 15 is a plan view showing the plug-side unit in an unlocked state.

When the sleeves 18 of all the plugs 2 are at the locking completion position, as shown in FIG. 14, the annular groove 18c on the outer peripheral surface 18' of the sleeve 18 of each plug 2 is radially aligned with the confirmation plate 7. When, in this state, the push portion 7b of the confirmation plate 7 is pushed rightward as seen in FIG. 1, the opening edge 7e of each opening enters the annular groove 18c of the associated plug 2. Thus, the confirmation plate 7 assumes a locking confirmed position that shows the sleeves 18 of all the plugs 2 are at the locking completion position.

When the confirmation plate 7 reaches the locking confirmed position, the fitting hole 11a formed in the support member 11 of the plug-side unit 3 and the insertion hole 7f of the confirmation plate 7 align with each other, and the connection confirmation pin 26 is allowed to move leftward through the insertion hole 7f and the fitting hole 11a by the urging device (spring) 27 (see FIG. 4). Consequently, the right end of the connection confirmation pin 26 withdraws into the tubular member 25, resulting in the red indicator 26c disappearing.

In a case where any of the sleeves 18 is not at the locking completion position, even if the confirmation plate 7 is pushed in, the edge 7e of the opening associated with the sleeve 18 that is not at the locking completion position abuts against the outer peripheral surface 18' of the sleeve 18, thus preventing the confirmation plate 7 from moving from the locking unconfirmed position to the locking confirmed position. Accordingly, the red indicator 26c remains appearing.

<From Locked State to Unlocked State>

Figure 13:
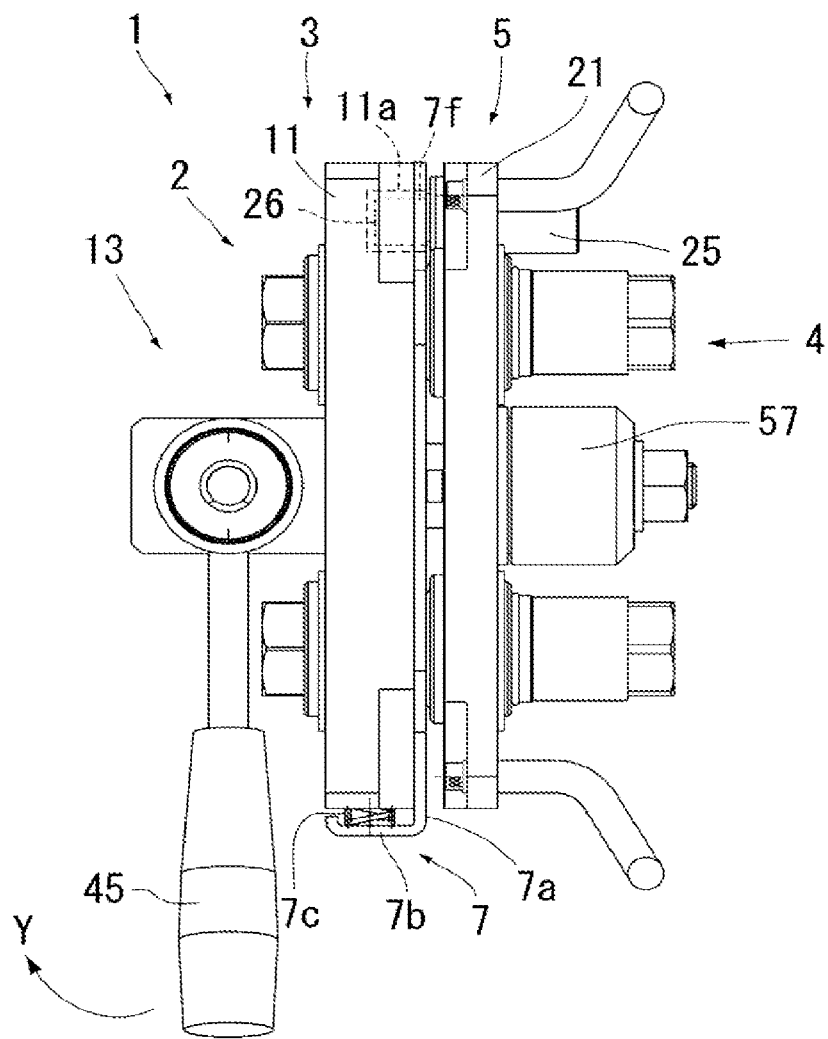
FIG. 13 is a plan view showing the socket-side unit and the plug-side unit when the confirmation plate has been moved to the locking confirmed position when the socket-side unit and the plug-side unit are in the locked state.

When, in the locked state, the operating lever 45 is turned clockwise (direction Y) as shown in FIG. 13, the female coupling member 41 advances in the direction opposite to the above. When the operating lever 45 reaches the position shown in FIG. 7, the locking members 54 disengage from the engagement groove 24, and the plunger part 58 comes out of the insertion hole 50b of the tubular part 50. Thus, the locked state is canceled. At this time, the locking elements 33 of the sockets 4 also disengage from the engagement grooves 12b of the plugs 2, and thus the sockets 4 and the plugs 2 are disconnected from each other. When the connection between the sockets 4 and the plugs 2 is canceled, their fluid passages 14 and 30 are closed by the respective valve members.

When the locked state is canceled, the connection confirmation pin 26 disengages from the fitting hole 11a of the support member 11 and the insertion hole 7f of the confirmation plate 7. Thus, the plate body 7a is returned to the unconnected position by the urging force of the spring 7c.

Figure 3:
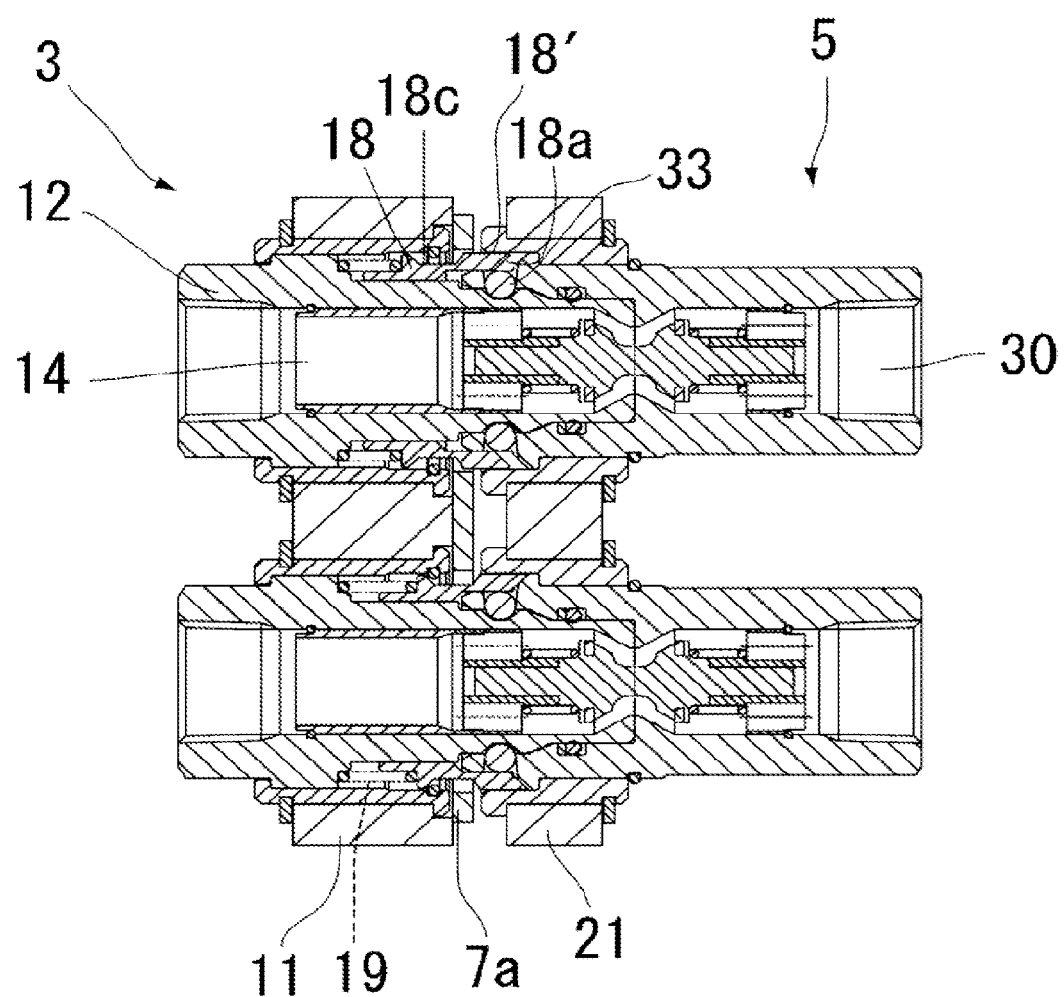
FIG. 3 is a longitudinal sectional view of the pipe coupling apparatus according to the embodiment, showing a state where the socket-side unit and the plug-side unit are connected together and the sockets and plugs of the two units are connected to each other.

As has been stated above, according to this embodiment, only when all the sleeves 18 are at the locking completion position after the plug-side unit 3 and the socket-side unit 5 have been coupled together, the confirmation plate 7 can move from the locking unconfirmed position to the locking confirmed position. That is, if any of the sleeves 18 is not at the locking completion position, unlike as shown in FIG. 3, the confirmation plate 7 cannot move from the locking unconfirmed position to the locking confirmed position. Therefore, it is possible to easily check whether or not there is any sleeve 18 that is not at the locking completion position when the plug-side unit 3 and the socket-side unit 5 are coupled together, and hence possible to prevent the operator from letting a fluid flow through the sockets 4 and the plugs 2 that are inappropriately connected to each other.

In addition, it is possible to check whether or not there is any sleeve 18 that is not at the locking completion position simply by pushing in the confirmation plate 7. Therefore, the checking operation is easy. Upon completion of the coupling of the plug-side unit 3 and the socket-side unit 5, the connection confirmation pin 26 projects from the tubular member 25. Therefore, the operator who recognizes the connection confirmation pin 26 is unlikely to forget to push the confirmation plate 7 as required. When the confirmation plate 7 reaches the locking confirmed position, the connection confirmation pin 26, which has been projecting, disappears into the tubular member 25. Therefore, it can be easily confirmed that the sockets 4 and the plugs 2 are surely connected to each other. The visibility of the connection confirmation pin 26 is good because the red indicator 26c is provided thereon.

FIGS. 16 to 19 show a modification of the pipe coupling apparatus according to the above-described embodiment. Basically, the pipe coupling apparatus of this modification has the same structure as that of the pipe coupling apparatus according to the above-described embodiment. In the following description, the same constituent elements as those of the above-described embodiment are denoted by the same reference numerals as those used in the foregoing embodiment.

Figure 16:
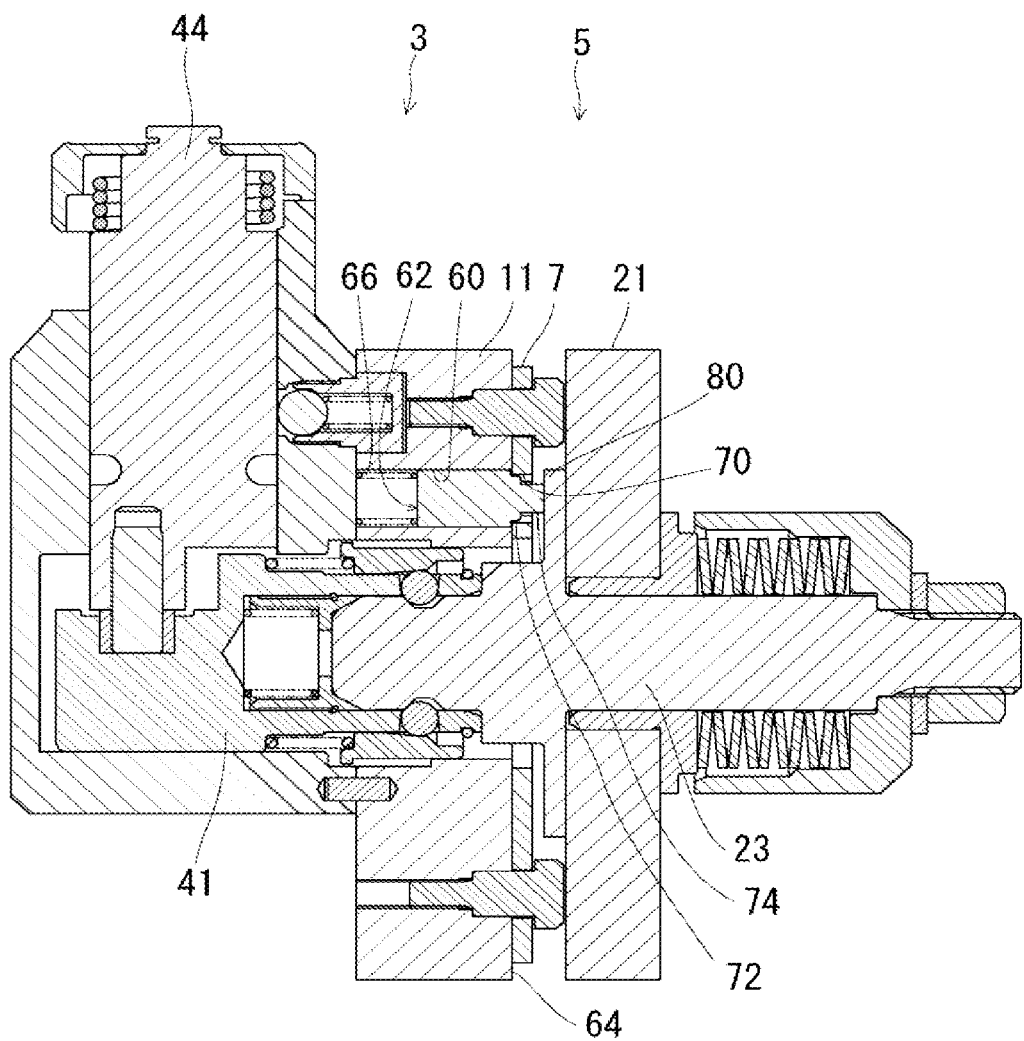
FIG. 16 is a sectional view of a coupler of a pipe coupling apparatus according to a modification of the above-described embodiment, showing a state the male and female coupling members of the coupler have been coupled together but the plugs and the sockets have not yet been connected to each other.
Figure 17:
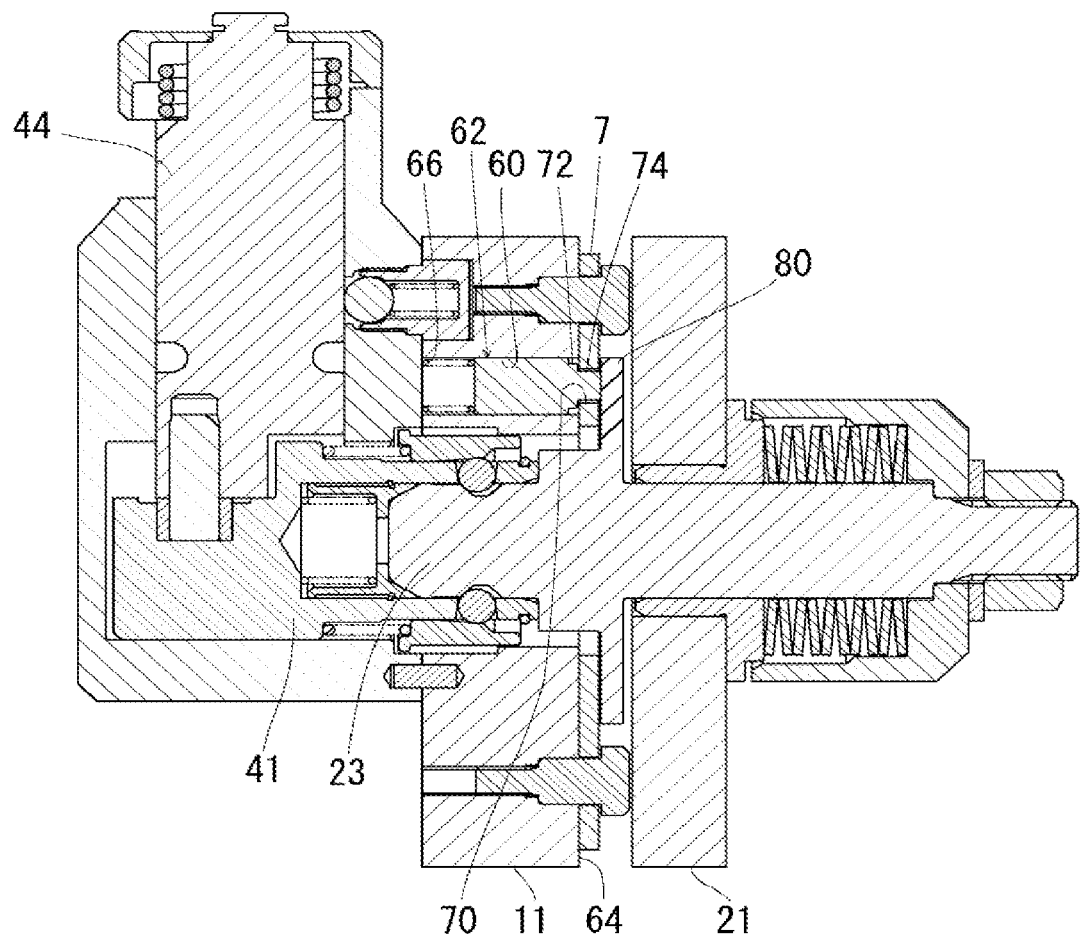
FIG. 17 is a sectional view similar to FIG. 16, showing a state where the plugs and the sockets have been connected to each other and the locking of the plugs and the sockets has been completed as a result of the socket-side unit being pulled toward the plug-side unit by the operation of an operating lever, and in this state, the confirmation plate has been moved to the locking confirmed position.
Figure 18:
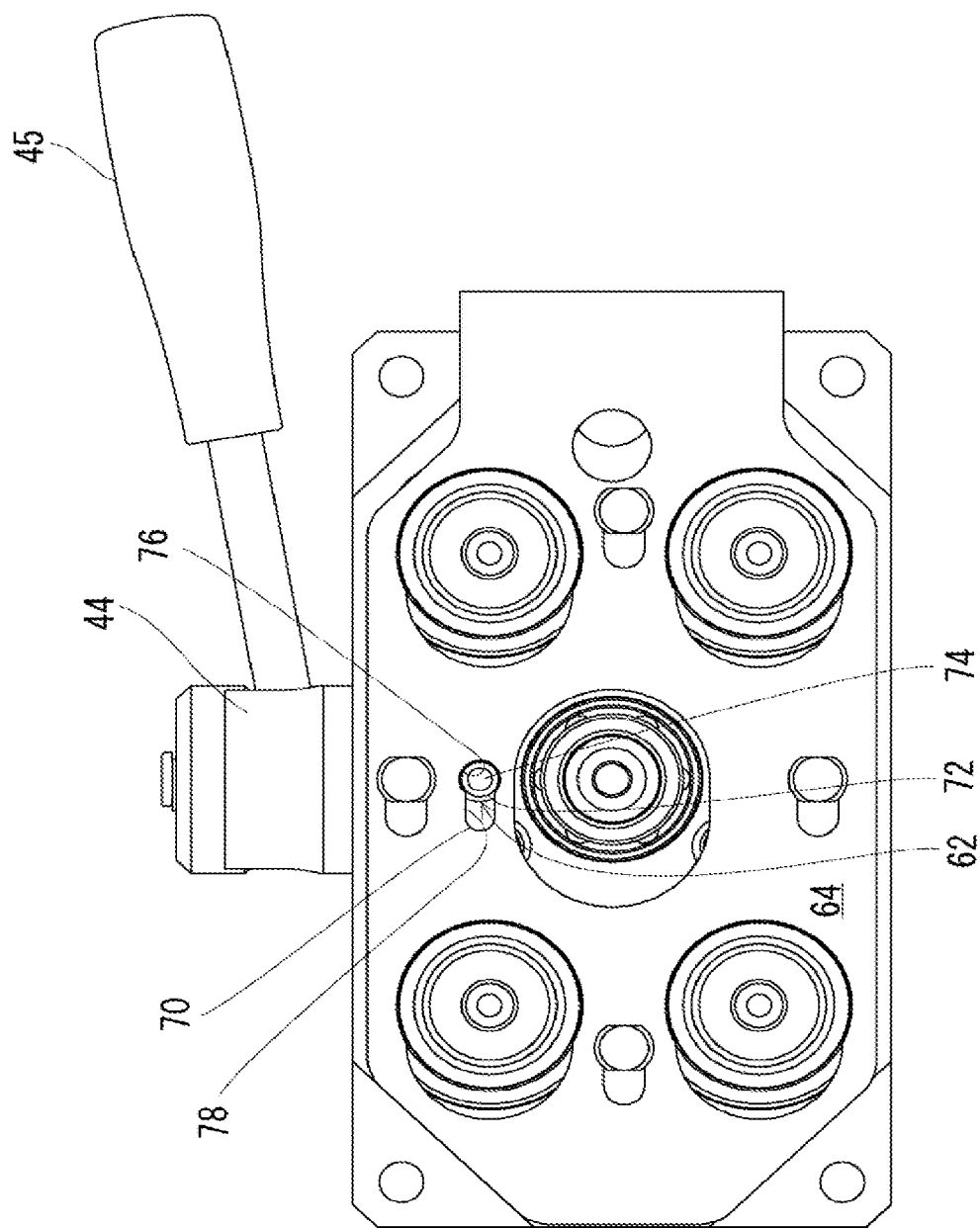
FIG. 18 is a front view of the plug-side unit in the state shown in FIG. 16.
Figure 19:
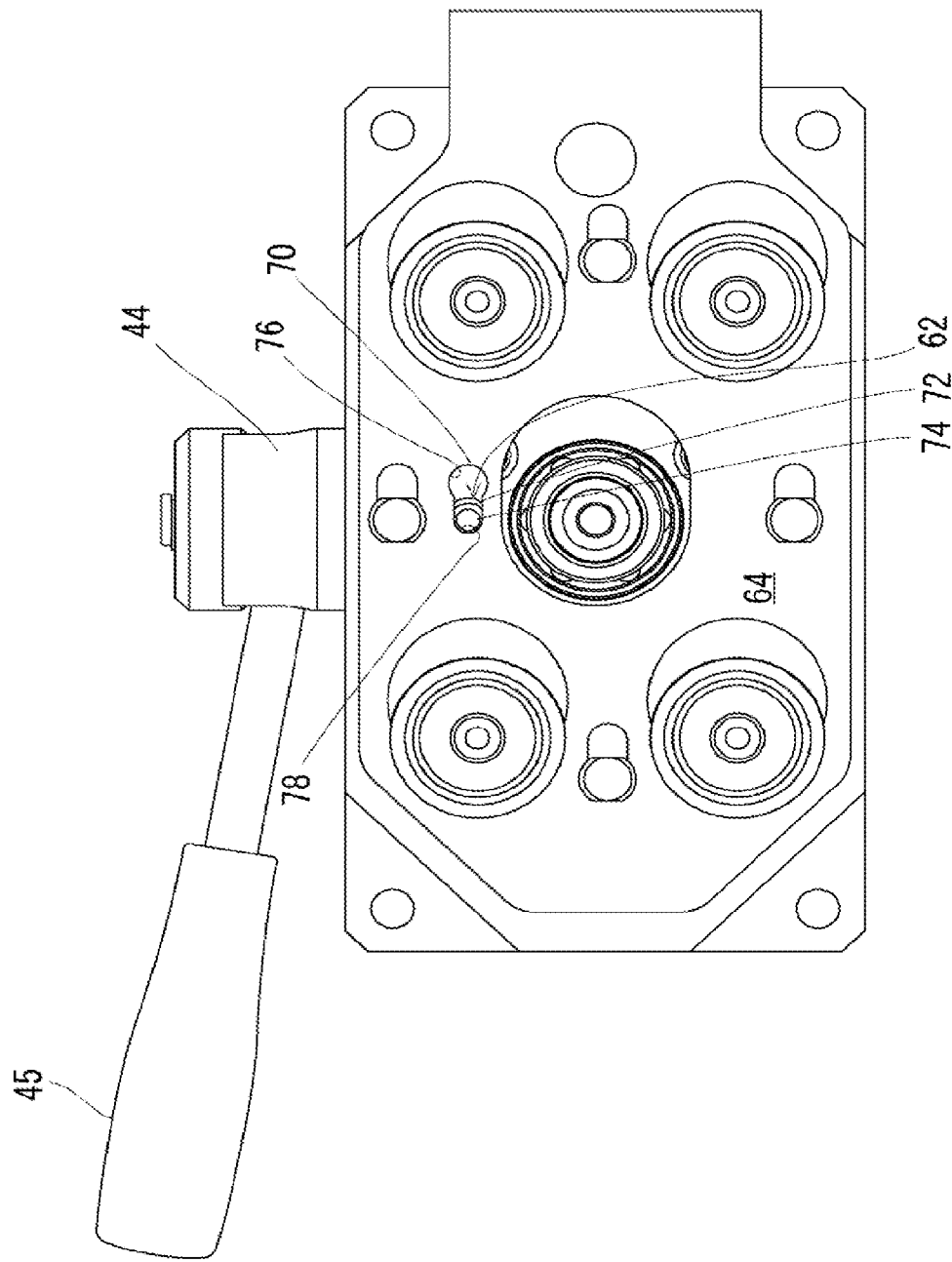
FIG. 19 is a front view of the plug-side unit in the state shown in FIG. 17.

In the pipe coupling apparatus according to this modification, the socket-side unit 5 is brought close to the plug-side unit 3 to insert the sockets 4 into the corresponding plugs 2 and to couple together the female and male coupling members 41 and 23 of the coupler, and thereafter, the operating lever is operated to rotate the rotating shaft 44 to pull the socket-side unit 5 toward the plug-side unit 3. During this operation, the confirmation plate 7 is automatically moved to the locking confirmed position when the plugs 2 and the sockets 4 reach their respective positions where they are to be connected to each other. That is, in this pipe coupling apparatus, the plug support member 11 has a hole 60 opening on its surface 64 facing the socket support member 21, a pin 62 slidable in the hole 60, and a spring 66 that urges the pin 62 to project its forward end portion from the surface 64. Meanwhile, the confirmation plate 7 has a through-hole 70 that passes the forward end portion of the pin 62. The forward end portion of the pin 62 has a stepped configuration. That is, the portion of the pin 62 that enters the through-hole 70 has a large-diameter portion 72 and a small-diameter portion 74. The through-hole 70 has, as shown in FIGS. 18 and 19, a large-diameter opening 76 that can receive the large-diameter portion 72 of the pin 62, and a small-diameter opening 78 that cannot receive the large-diameter portion 72 of the pin 62 but that can receive only the small-diameter portion 74. As shown in FIG. 16, the forward end of the pin 62 is inserted in the large-diameter opening 76 of the through-hole 70 (see FIGS. 16 and 18) and the small-diameter portion 74 of the pin 62 projects toward the socket support member 21 from the surface 64 of the plug support member 11 before the female and male coupling members 41 and 23 of the coupler are coupled together and also after the female and male coupling members 41 and 23 have been coupled together and before the plugs 2 and the sockets 4 reach their respective positions where they are to be connected to each other, that is, before the operating lever is operated. When the operating lever is turned to pull the socket-side unit 5 toward the plug-side unit 3 to bring the plugs 2 and the sockets 4 to their respective positions where they are to be connected to each other (see FIG. 17), the pin 62 is pushed in by a projection 80 projecting from the male coupling member 23. As a result, the large-diameter portion 72 of the pin 62 is pushed out of the through-hole 70. Between the plug support member 11 and the confirmation plate 7, a spring (not shown) is fitted in a manner similar to that of the spring 7c shown in FIG. 4 to urge the confirmation plate 7 rightward in FIGS. 18 and 19 (i.e. toward the locking confirmed position shown in FIG. 19 from the locking unconfirmed position shown in FIG. 18). Therefore, in response to the large-diameter portion 72 of the pin 62 being pushed out of the through-hole 70, the confirmation plate 7 moves rightward, and the small-diameter portion 74 of the pin 62 engages with the small-diameter opening 78 of the through-hole 70. If, at this time, there are a plug and a socket for which the locking has not yet been completed and therefore the associated sleeve 18 has not yet been displaced to the locking completion position, the confirmation plate 7 is prevented from being displaced to the locking confirmed position by the sleeve 18. Thus, it is confirmed that the locking has not yet been completed.

Although one embodiment of the pipe coupling apparatus according to the present invention has been described above, the present invention is not limited to the above-described embodiment. In the foregoing embodiment, the plugs 2 are provided on the unit that is provided with the female coupling member 41, and the sockets 4 are provided on the unit provided with the male coupling member 23. The present invention, however, is not limited to this structure. The sockets 4 may be provided on the unit provided with the female coupling member 41 and the plugs 2 on the unit provided with the male coupling member 23. Although the sleeve 18 is provided on each plug 2, the present invention is not limited to this structure. The sleeve 18 may be provided on each socket 4.

The invention claimed is:
1. A pipe coupling apparatus, comprising:
a socket-side unit having a socket support member and a plurality of tubular sockets supported parallel to each other by the socket support member;
a plug-side unit having a plug support member and a plurality of tubular plugs supported parallel to each other by the plug support member, the plugs having a positional corresponding relationship with the sockets, the plugs and the sockets being configured to be locked to each other via locking elements when the socket-side unit and the plug-side unit are moved relatively toward each other with the plugs facing the sockets, and each plug of the plugs is inserted into a corresponding socket of the sockets so as to reach a connecting position;
a plurality of locking devices for locking the plugs and the corresponding sockets to each other when the plugs are inserted into the corresponding sockets to reach a connecting position where the plugs are to be connected with the corresponding sockets as a result of moving the socket-side unit and the plug-side unit relatively toward each other with the plugs facing the corresponding sockets, each of the locking devices includes:
  a sleeve on each of the plugs and displaceable between a locking completion position for completing locking of the plugs and the corresponding sockets and a retracted position separated from the locking completion position; and
  a sleeve urging device for urging the respective sleeve of each of the plugs toward the locking completion position so that the sleeve urging device moves the respective sleeve toward the locking completion position when the plugs reach the connecting position where the plugs are to be connected with the corresponding sockets;
a confirmation plate displaceably mounted on the surface of the plug-side unit facing the socket-side unit so as to be moveable in a direction perpendicular to axes of the plugs, and positioned between surfaces of the socket and plug support members, the surfaces of the socket and plug support members being opposite each other when the socket-side unit and the plug-side unit are moved toward each other, the confirmation plate being configured and arranged to be displaced to a confirmed position by moving in a direction normal to axes defined by each said plug and said corresponding socket when each said plug and said corresponding socket are connected and locked; and
a confirmation pin supported by one of the socket support member and the plug support member and extending through the one of the socket support member and the plug support member, while being imposed with an urging force from an urging device toward another of the socket support member and the plug support member so that the confirmation pin partially projects out of a surface of the one of the socket support member and the plug support member in a direction of the urging force, and
wherein the confirmation plate has openings through which the corresponding plugs extend, the confirmation plate being configured so that, when any of the sleeves is positioned at the retracted position, the confirmation plate is prevented from being displaced to the locking confirmed position by engagement between the sleeves positioned at the retracted position and an edge of the respective openings through which extend the plugs associated with the sleeves positioned at the refracted position;
wherein the sleeve of each of the locking devices has an outer surface configured to align with the edge of the corresponding opening in a direction perpendicular to the axial direction when the sleeve of each of the locking devices is at the retracted position, a recess being formed on the outer surface of the sleeve of each of the locking devices, the recess being configured to align with the edge of the corresponding opening in a direction perpendicular to the axial direction when the sleeve is at the locking completion position;
wherein the confirmation plate is configured to enable the confirmation pin to partially project from the one of the socket support member and the plug support member, when the socket-side unit and the plug-side unit have been moved toward each other and the confirmation plate has been displaced to the confirmed position, and is configured to engage the confirmation pin and press the confirmation pin against the urging force from the urging device so that the confirmation pin partially extends out of the one of the socket support member and the plug support member in a direction opposite to the direction of the urging force when the socket-side unit and the plug-side unit have been moved toward each other with the confirmation plate positioned out of the confirmed position.

2. The pipe coupling apparatus of claim 1,
wherein each locking member of the plurality of locking members is configured to be displaced between a locking position in which the locking member engages with both respective plug and the corresponding socket to prevent the respective plug and the corresponding socket from being axially displaced relative to each other when each of the plugs has been inserted into the corresponding sockets to reach the connecting position, and an unlocking position in which the locking member is radially displaced to disengage from the respective plug thereby enabling the respective plug and the corresponding socket to axially move relative to each other; and
wherein each of the plurality of sleeves is mounted around a corresponding one of the plugs and the corresponding socket displaceably in an axial direction of the sleeve between a locking completion position to hold the locking member at the locking position and a retracted position to enable the locking member to move to the unlocking position, and
wherein the openings of the confirmation plate are configured to enable the plugs to be inserted thereinto by the relative movement of the socket-side unit and the plug-side unit toward each other.

3. The pipe coupling apparatus of claim 1, wherein the socket-side unit and the plug-side unit have a coupler for coupling the socket-side unit and the plug-side unit to each other, the coupler having a male coupling member and a female coupling member that are configured to be fitted to each other and locked in a coupled relationship when the plugs are inserted into the sockets to reach the connecting position where the plugs are to be connected with the sockets, as a result of moving the socket-side unit and the plug-side unit relatively toward each other with the plugs facing the sockets.

4. The pipe coupling apparatus of claim 3, wherein the coupler has the male coupling member disposed on the one of the plug support member and the socket support member and the female coupling member disposed on the other of the plug support member and the socket support member;
the male coupling member projecting from a surface of the one of the plug support member and the socket support member and configured to face the other of the plug support member and the socket support member and configured to be fitted and locked to the female coupling member;
the pipe coupling apparatus further comprising:
a pulling member configured to pull the one of the plug support member and the socket support member toward the other of the plug support member and the socket support member by displacing the female coupling member fitted and coupled with the male coupling member in a direction away from the one of the plug support member and the socket support member, thereby enabling the plugs to be further inserted into the sockets to reach the connecting position where the plugs are to be connected with the sockets.

5. The pipe coupling apparatus of claim 4, wherein the male coupling member has a plunger part extending through a substantially central position of the one of the plug support member and the socket support member and being configured to be displaced relative to the one of the plug support member and the socket support member, the plunger part projecting from the surface of the one of the plug support member and the socket support member facing the other of the plug support member and the socket support member so as to be fitted and locked to the female coupling member, and a rear projecting part projecting from a surface of the one of the plug support member and the socket support member opposite to the surface from which the plunger part projects, and
wherein the rear projecting part is disposed with a spring member configured to urge the one of the plug support member and the socket support member toward the other of the plug support member and the socket support member to enable the male coupling member fitted and locked to the female coupling member to displace the one of the plug support member and the socket support member toward the other of the plug support member and the socket support member through the spring member when the pulling member displaces the female coupling member in the direction away from the one of the plug support member and the socket support member.

6. The pipe coupling apparatus of claim 3, further comprising:
a second urging device configured to urge the confirmation plate toward the confirmed position from an unconfirmed position; and
a holding member configured to be displaced between a holding position where the holding member holds the confirmation plate at the unconfirmed position against the urging device and an enabling position where the holding member enables the confirmation plate to be displaced from the unconfirmed position to the confirmed position when the socket-side unit and the plug-side unit are adjacent each other until the plugs and the sockets reach the connecting position.

7. The pipe coupling apparatus of claim 6, wherein the confirmation plate has a through-hole extending therethrough in a direction from the socket-side unit toward the plug-side unit, and
wherein the holding member is a pin mounted on the one of the socket-side unit and the plug-side unit and is configured to be urged toward the other of the socket-side unit and the plug-side unit, the pin having a forward end portion extending through the through-hole of the confirmation member and projecting toward the other of the socket-side unit and the plug-side unit, the forward end portion having a small-diameter portion extending rearward from a forward end and a large-diameter portion contiguous with the small-diameter portion, the pin being configured to hold the confirmation plate at the unconfirmed position by engagement of the large-diameter portion with a wall surface of the through-hole, the pin being configured to be pushed in by the other of the socket-side unit and the plug-side unit, causing the large-diameter portion to be pushed out of the through-hole, when the socket-side unit and the plug-side unit are adjacent to each other until the plugs and the sockets reach the connecting position, thereby enabling the confirmation plate to be displaced to the confirmed position.

8. The pipe coupling apparatus of claim 1, wherein a portion of the confirmation pin that extends out of the one of the socket support member and the plug support member in the opposite direction comprises a colored indicator to indicate that the confirmation plate has not been displaced to the confirmed position.

* * * * *